(12) United States Patent
Streib

(10) Patent No.: US 7,146,803 B2
(45) Date of Patent: Dec. 12, 2006

(54) METHOD AND ARRANGEMENT FOR MONITORING THE OPERABILITY OF A SECONDARY AIR SYSTEM

(75) Inventor: Martin Streib, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 378 days.

(21) Appl. No.: 10/366,560

(22) Filed: Feb. 14, 2003

(65) Prior Publication Data
US 2005/0016265 A1    Jan. 27, 2005

(30) Foreign Application Priority Data
Feb. 14, 2002    (DE) .............................. 102 05 966

(51) Int. Cl.
*F01N 3/00* (2006.01)
(52) U.S. Cl. ............................ 60/289; 60/274; 60/277; 60/290; 60/292
(58) Field of Classification Search ................. 60/274, 60/277, 289, 290, 291, 292, 293; 73/118.1
See application file for complete search history.

(56) References Cited

U.S. PATENT DOCUMENTS

| 5,333,446 A | * | 8/1994 | Itoh ........................... 60/274 |
| 5,615,552 A | * | 4/1997 | Shimasaki et al. ............ 60/277 |
| 5,782,086 A | * | 7/1998 | Kato et al. ..................... 60/274 |
| 5,852,929 A | * | 12/1998 | Kato et al. ..................... 60/274 |
| 5,857,325 A | * | 1/1999 | Shimasaki et al. ............ 60/284 |
| 6,192,678 B1 | * | 2/2001 | Tachibana ..................... 60/289 |
| 6,393,833 B1 | * | 5/2002 | Mizoguchi ..................... 60/289 |
| 6,497,094 B1 | | 12/2002 | Tuleweit et al. |

* cited by examiner

*Primary Examiner*—Binh Q. Tran
(74) *Attorney, Agent, or Firm*—Walter Ottesen

(57) ABSTRACT

The invention relates to a method and an arrangement for monitoring the operability of a secondary air system of an internal combustion engine having an exhaust-gas system. The secondary air system includes a secondary air pump. In the method and arrangement, a signal is determined which characterizes the secondary air flow. In the method, at least one signal of at least one operating characteristic variable of the secondary air pump is determined during the determination of the signal characterizing the secondary air flow and a conclusion is drawn as to a fault in the secondary air system when the signal of the at least one operating characteristic variable lies outside of a pregiven interval. The at least one signal of at least one operating characteristic variable is determined in dependence upon the operating state of the engine. This signal is determined from a signal for the pump current of an electrically operated secondary air pump.

14 Claims, 2 Drawing Sheets

METHOD AND ARRANGEMENT FOR MONITORING THE OPERABILITY OF A SECONDARY AIR SYSTEM

BACKGROUND OF THE INVENTION

U.S. Pat. No. 6,497,094 discloses a method and an arrangement wherein a signal for the secondary air flow is determined and an evaluation of the operability of the secondary air system is based on this signal. The signal for the secondary air flow is determined from the following: a signal for the intake air flow; a signal for the ratio of the intake air flow to the fuel metered per unit of time which is determined by computation; and, an exhaust-gas lambda value detected by means of a probe.

In order to further increase the accuracy in the determination of the signal for the secondary air flow, the secondary air flow could be measured directly with an air mass sensor which, for example, is mounted on the secondary air pump. The result of this measurement (actual value) is compared to a desired value. For a deviation of the actual value from the desired value, the pump power of the secondary air pump is so readjusted that the desired and actual value become coincident. What is problematic is that faults, which affect the operability of the secondary air system, are only detected when the control range of the secondary air pump is exceeded. Faults which can affect the operability of the secondary air system include, for example, a defective air sensor or leakages or obstructions in the secondary air system.

SUMMARY OF THE INVENTION

It is an object of the invention to so improve the method and arrangement of the kind described initially herein that the reliability in the detection of faults in the secondary air system is increased for a secondary air flow determination and especially a secondary air mass determination. It is a further object of the invention to improve the accuracy of the secondary air mass determination. Furthermore, the method is to be carried out with less technical complexity and cost effectively. Also, the arrangement is to be realized with reduced complexity and also cost effectively.

The method of the invention is for monitoring the operability of a secondary air system of an internal combustion engine having an exhaust-gas system. The secondary air system includes a secondary air pump and the method includes the steps of: determining a first signal characterizing the secondary air flow; determining a second signal of at least one operating variable of the secondary air pump during the determination of the first signal; and, drawing a conclusion as to a fault in the secondary air system when the second signal lies outside of a pregivable interval.

In the method of the invention, at least one signal of at least one operating characteristic variable of the secondary air pump is determined during the determination of the signal characterizing the secondary air flow and a conclusion is drawn as to a fault in the secondary air system when the signal of the operating characteristic value lies outside of a pregiven interval. The inclusion of a further variable has the significant advantage that the quality of the fault detection in the secondary air system is clearly improved.

In an advantageous embodiment, the at least one signal of at least one operating characteristic variable is determined for at least one operating point of the internal combustion engine and/or of the secondary air system. It has been found during extensive experimentation that the accuracy of the secondary air flow determination is considerably improved when a method according to the invention is carried out at an operating point which, for example, is characterized by a specific operating temperature and/or a specific rpm of the engine.

In a further advantageous embodiment, the at least one signal of at least one operating characteristic variable is determined from a signal for the pump current when utilizing an electrically operated secondary air pump. In this way, the operability of the secondary air pump can be easily checked with simple means and without substantial technical complexity because the pump current is anyway detected in the control of the pump or is determined from available signals.

Preferably, the electrically operated secondary air pump is driven at a clock frequency and the pregivable interval is stored in dependence upon the drive pulse duty factor especially in a characteristic line field and the signal for the pump current is determined and a conclusion is drawn as to a fault when the signal for the pump current lies outside of the pregivable interval for the particular drive pulse duty factor. The control of the blownin secondary air flow can be carried out when using a clock-operated pump simply by changing the drive pulse duty factor, especially, by programming a control unit for the secondary air pump. However, the relationship between the pump current and the secondary air flow changes because of the clocked operation of the secondary air pump. A determination of the pump current without considering the drive pulse duty factor would therefore be burdened with an error. The reliability of monitoring is significantly increased by including the drive pulse duty factor as an index of the pump current of the clock-operated secondary air pump.

To further increase the accuracy of monitoring, the drive pulse-duty factor is corrected with a signal for the rpm of the secondary air pump in a further embodiment. For example, a signal for the rpm can be the signal of a vane pump which is determined especially from the signal form for the pump current of the secondary air pump (especially the waviness of the signal) and/or a signal for a supply voltage which is determined especially from a signal for the battery voltage. In this way, influences are considered which operate on the electric current drawn by the pump and lead to a reduction of the secondary air mass in the presence of a constant drive pulse-duty factor such as, for example, changes in the input pressure or back pressure of the pump. Furthermore, changes of the supply voltage are considered in that the drive pulse-duty factor is corrected with a signal for the supply voltage. These changes of the supply voltage can be caused, for example, by contact resistances in the current loop or interruptions of the current loop. Here, the battery voltage can be advantageously determined as the supply voltage with the internal combustion engine switched off whereby the influence of disturbing influences is reduced compared to a determination during the operation of the engine.

In a preferred embodiment of the method, the pregivable interval is pregiven in dependence upon a signal for the back pressure in the exhaust-gas system and/or a signal for the ambient air pressure. In this way, it is considered that the relationship between the signal for the operating characteristic variable (especially a signal for the pump current) and the signal for the secondary air flow is changed by the back pressure and/or the ambient air pressure.

In an advantageous embodiment of the method, the signal of at least one operating characteristic variable is compared to the signal for the secondary air flow. In this way, the fault-free operation of the secondary air system can not only be checked by each of the two signals by themselves but also by the interrelationship between the signals and, in this way, a conclusion can be drawn as to a malfunction of the secondary air system when there are deviations from this relationship.

In a further embodiment of the method, additional sensors are unnecessary in that the signal for the secondary air flow is determined from the difference between a signal for the total air flow and a signal for the engine air flow. The signals for the engine air flow and the total air flow, which are applied for the determination, can anyway be detected or be determined from already detected signals.

The arrangement of the invention is characterized by at least one sensor for detecting a signal for the pump current of the secondary air pump and by a comparator for comparing this signal to a pregivable desired value and by means for outputting a fault announcement. It is here advantageous that the pump is anyway driven by a control unit which includes components which, especially by programming, can be used for detecting the signal and for comparing the signal to a pregivable desired value.

In an advantageous embodiment of the arrangement, a voltage drop on a resistor in the pump current loop of the secondary air pump is detected with measuring means and from this, the signal for the pump current is determined and/or the signal for the pump current is determined by a Hall sensor mounted on the secondary air pump. In this way, the pump current is determined very accurately and therefore the quality of the fault detection is significantly improved.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
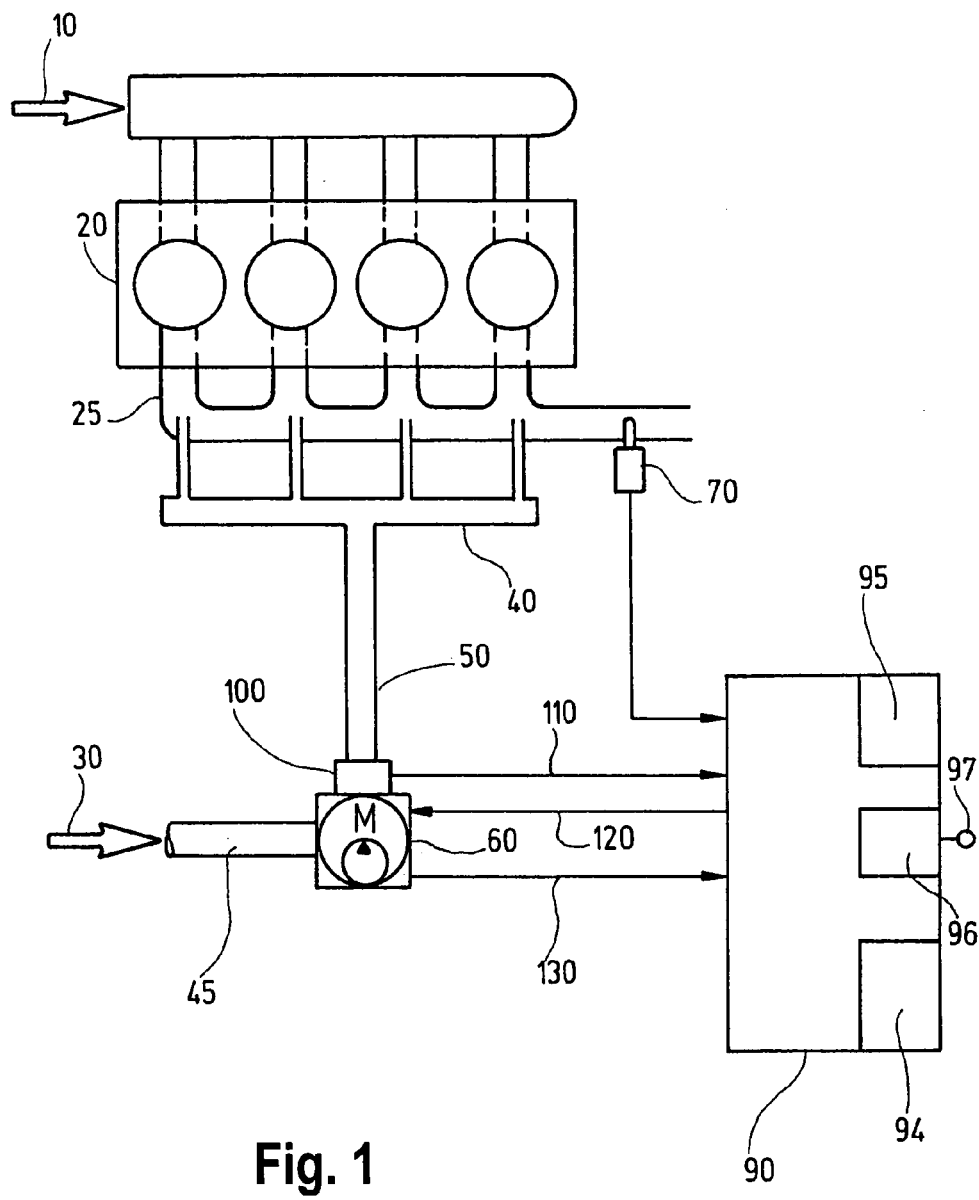
FIG. 1 is a schematic of a secondary air pump system of an internal combustion engine which includes a catalytic converter.

In FIG. 1, an internal combustion engine 20 is supplied with intake air (arrow 10) in a manner known per se.

The exhaust gases, which arise during combustion, are conducted via an exhaust-gas pipe 25 to an exhaust-gas system (not shown). It is understood that the exhaust-gas system can include a catalytic converter.

A lambda probe 70 is mounted in the exhaust-gas pipe 25 between the engine 20 and the exhaust-gas system. The lambda probe 70 is especially a stabilized probe such as a broadband lambda probe. With the probe, the air/fuel ratio in the exhaust gas is determined in a manner known per se and is transmitted to a control unit 90.

The lambda probe 70 can also be realized by another probe type such as a two-point lambda probe or a resistive probe.

With a secondary air pump 60, secondary air (arrow 30) is blown from an intake line 45 through a secondary air conduit 50 and a secondary air distributor unit 40 into the exhaust-gas pipe 25.

A secondary air mass sensor 100 is mounted on the secondary air pump 60 in the secondary air line 50. This sensor 100 can, for example, be a hot film air mass sensor. The value of a measured secondary air mass M is transmitted via a signal line 110 to the control unit 90.

It is understood that also the secondary air flow can be measured in lieu of the secondary air mass M. Furthermore, the secondary air mass sensor 100 can be realized in another form, for example, as an air quantity sensor or an air mass throughflow sensor or as measuring means fulfilling the same purpose.

The secondary air pump 60 is driven by the control unit 90 via a signal line 120. Furthermore, operating characteristic variables of the secondary air pump 60 are transmitted to the control unit 90 via a signal line 130. The pump current (i) is detected as an operating characteristic variable especially when using an electrically operated secondary air pump.

In principle, any other operating characteristic variable can be detected depending upon the type of pump.

Accordingly, the stroke frequency can be detected as an operating characteristic variable when utilizing a membrane pump.

Furthermore, a mechanical pump can be used in lieu of an electrically operated secondary air pump. The mechanical pump can, for example, be driven via a belt. Here, the rpm can, for example, be detected as an operating characteristic variable.

The control unit 90 includes, for example, a comparator 95 with which the detected pump current (i) is compared to a pregivable desired value and, from the result of the comparison, a conclusion is drawn as to faults in the secondary air system. A conclusion can especially be drawn as to obstructions or leakages in the intake line 45 and/or in the secondary air line 50 and/or as to function disturbances in the secondary air pump 60 and/or as to function disturbances in the secondary air mass sensor 100. Furthermore, the control unit 90 includes an output unit 96 having a connection 97 for outputting a fault announcement, for example, to an indicator unit (not shown).

Furthermore, the control unit 90 can include a storage unit 94 wherein at least one characteristic line field is stored from which the relationship between the pump current (i) and the secondary air mass M becomes apparent for different operating states of the internal combustion engine and/or of the secondary air system. An operating state is, for example, characterized by the operating temperature of the engine or of the catalytic converter.

The storage unit 94, the comparator 95, the output unit 96 and/or the connection 97 can also be connected in another form to the control unit 90 and can be mounted in or on separate housings or components.

Figure 2A:
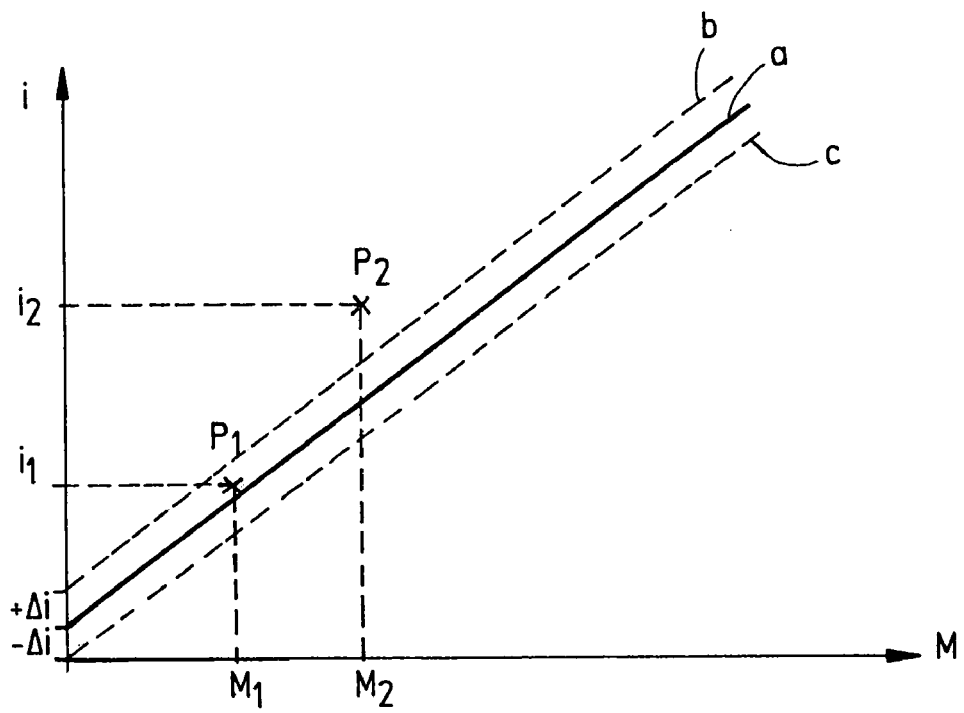
FIG. 2a schematically shows the relationship between the pump current of an electrically operated secondary air pump and the secondary air mass introduced by the pump for a pregiven operating state of the internal combustion engine and of the secondary air system.

A characteristic line for the relationship between the pump current (i) and the secondary air mass M is shown by way of example in FIG. 2a for a pregiven operating state.

Curve (a) shows the relationship between the desired values of the pump current (i) and the introduced secondary air mass M for a fault-free operation of the secondary air system. It is understood that the linear relationship here is only by way of example.

An interval with limits (desired value pump current i+Δi) and (desired value i−Δi) is pregiven by the curves (b) and (c). It is understood that also other limits can be selected which can vary with the pump current (i).

A conclusion is drawn as to a fault-free operating secondary air system when a measuring point P lies within the pregiven interval. The measuring point P corresponds to a value pair (i, M). In this way, a measuring point $P_1$ having a value pair ($i_1$, $M_1$) is within the interval and therefore a conclusion is drawn as to a fault-free operation of the secondary air system. In contrast, a measuring point $P_2$ having a value pair ($i_2$, $M_2$) is disposed outside of this interval. Here, a conclusion is drawn as to a fault in the secondary air system.

The value pair (i, M) can be determined in different ways.

In a preferred embodiment, the secondary air mass M is determined at a known operating state and the pump current (i) of the secondary air pump 60 is detected, for example, from a voltage drop on a resistor (not shown) arranged in the pump current loop.

The pump current (i) can also be determined from a signal of a Hall sensor mounted on the pump.

The secondary air mass M is detected, for example, by a secondary air mass sensor 100. The desired value for the secondary air mass, which corresponds to the measured pump current (i), is taken from the characteristic line of FIG. 2a. If the determined value of the secondary air mass M deviates from this desired value by more than a pregiven value, then this value therefor lies outside of the interval and a conclusion is drawn as to a fault in the secondary air system.

Alternatively, it is also possible to take the desired value for the pump current, which corresponds to the determined secondary air mass M, from the characteristic line.

Figure 2B:
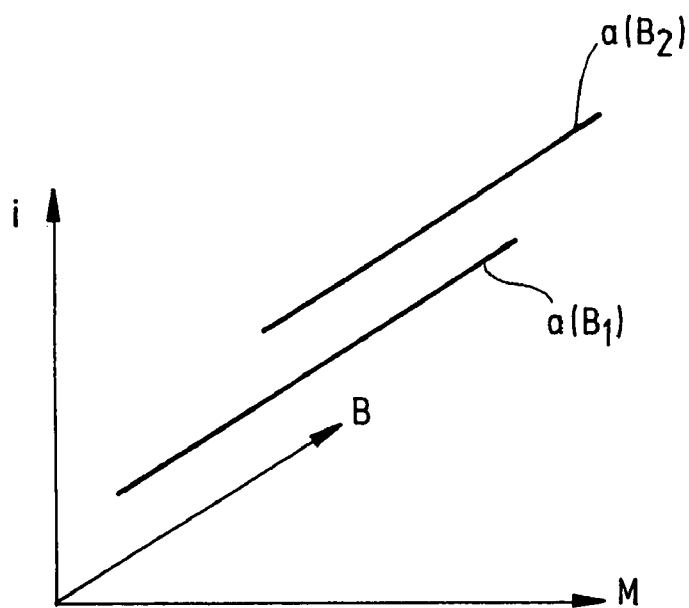
FIG. 2b shows a characteristic line field of a relationship shown in FIG. 2a between the pump current and the secondary air mass for different operating states of the internal combustion engine and of the secondary air system.

In FIG. 2b, a characteristic line field is shown by way of example which is composed of characteristic lines a($B_1$), a($B_2$), which correspond to the characteristic lines for different operating states shown in FIG. 2a. The operating states are characterized by values ($B_1$, $B_2$). The above-mentioned measurement points are then additionally determined by the value describing the operating state, for example, by the temperature of the internal combustion engine 20.

The characteristic line field can be supplemented by further characteristic lines for different operating states.

The limits of the intervals corresponding to the curves (b) and (c) in FIG. 2a are not shown in FIG. 2b.

The execution of the method for different operating states corresponds to the above-described method for one operating state.

In addition to the operating temperature of the engine, also other values can be used as parameters which describe the operating state of the engine and/or of the secondary air system.

Furthermore, it is understood that the pump can also be clock driven and that the interval for the pump current (i) is inputted in dependence upon the drive pulse-duty factor. Here, the drive pulse-duty factor can be corrected in dependence upon a pump rpm when utilizing, for example, a vane pump and/or in dependence upon a variable dependent upon the supply voltage and especially in dependence upon the battery voltage. Or, the pump rpm can be determined from a signal of the pump current (i) and especially from the ripple of the current signal. In this way, the desired value for the pump current (i) can be pregiven with very good accuracy.

In order to consider the changes of the relationship between the pump current (I) and the secondary air mass M against which the secondary air pump must blow, the desired value for the pump current (I) is corrected with a signal for the exhaust-gas back pressure, that is, the back pressure caused by the exhaust gas in the exhaustgas system and/or the desired value for the pump current (I) is corrected by a value for the ambient air pressure. The above changes for the relationship between the pump current (I) and the secondary air mass M are caused by a back pressure, especially the exhaust-gas back pressure and/or by the ambient air pressure. For the above, for example, the desired value for the pump current (I) is increased by a quantity which is proportional to the exhaust-gas back pressure and/or to the ambient air pressure.

In principle, in lieu of the change of the desired value for the pump current (i), the pump current (i) can be correspondingly corrected in dependence upon the drive pulse-duty factor and/or the back pressure.

Different configurations are possible with respect to the determination of the secondary air mass M. In lieu of determining the secondary air mass M directly with an air mass sensor or an air quantity sensor or a measuring means fulfilling the same purpose, the secondary air mass M can also be determined as a difference between a total air mass and the engine air mass. The total air mass is composed of the air mass in the combustion chambers of the engine (engine air mass) and the secondary air mass M. Here, the total air mass is detected, for example, with a further air mass sensor or an air quantity sensor in the intake air system (not shown). In contrast, the engine air mass is, for example, determined from: the charge of the combustion chambers; the pregiven air/fuel ratio; and, the lambda value measured by a lambda probe.

It is understood that in lieu of the engine air mass and the total air mass, also the engine air flow or the total air flow can be detected.

It is understood that the foregoing description is that of the preferred embodiments of the invention and that various changes and modifications may be made thereto without departing from the spirit and scope of the invention as defined in the appended claims.

What is claimed is:

1. A method for monitoring the operability of a secondary air system of an internal combustion engine having an exhaust-gas system, the secondary air system including a secondary air pump, the method comprising the steps of:
  determining a first signal characterizing the secondary air flow;
    determining a second signal of at least one operating variable of said secondary air pump during the determination of said first signal; and,
    drawing a conclusion as to a fault in said secondary air system when said second signal lies outside of a pregivable interval.

2. The method of claim 1, comprising the further step of determining said second signal at least at one operating point of at least one of said engine and said secondary air system.

3. The method of claim 2, wherein said secondary air pump is an electrically-operated secondary air pump; and, the method comprises the further step of determining said second signal from a signal for the pump current (I) of said electrically-operated secondary air pump.

4. A method for monitoring the operability of a secondary air system of an internal combustion engine having an exhaust-gas system, the secondary air system including an electrically-operated secondary air pump driven by a clocked drive having a drive pulse-duty factor,
  the method comprising the steps of:

determining a first signal characterizing the secondary air flow;

determining a second signal of at least one operating variable of said secondary air pump during the determination of said first signal;

drawing a conclusion as to a fault in said secondary air system when said second signal lies outside of a pregivable interval;

determining said second signal at least at one operating point of at least one of said engine and said secondary air system, and from a signal for the pump current (I) of said electrically-operated secondary air pump, storing said pregivable interval in dependence upon said drive pulse-duty factor; and, determining said signal for said pump current (I) and drawing a conclusion as to a fault when said signal for said pump current (I) lies outside of said pregivable interval at the drive pulseduty factor corresponding thereto.

5. The method of claim 4, wherein said pregivable interval is stored in a characteristic line field.

6. The method of claim 4, wherein said drive pulse-duty factor is determined with a signal for the rpm of said secondary air pump and/or is corrected by a signal for a voltage supply.

7. The method of claim 6, wherein said drive pulse-duty factor is determined from the signal form of said signal of the pump current (I) of said secondary air pump.

8. The method of claim 7, wherein said drive pulse-duty factor is determined from the waviness of said signal of the pump current (I) of said secondary air pump.

9. The method of claim 6, wherein said pulse-duty factor is corrected by a signal for the battery voltage.

10. The method of claim 1, wherein said pregivable interval is inputted in dependence upon a signal for the back pressure in the exhaust-gas system and/or a signal for the ambient air pressure.

11. The method of claim 1, wherein said second signal is compared to said first signal.

12. An arrangement for monitoring the operability of a secondary air system of an internal combustion engine having an exhaust-gas system, the secondary air system including a secondary air pump, the arrangement comprising:

a first sensor for detecting a first signal characterizing the secondary air flow;

a second sensor for detecting a second signal for the pump current (I) of said secondary air pump;

a comparator for comparing said second signal to a pregivable desired value; and, means for outputting a fault announcement.

13. The arrangement of claim 12, wherein said arrangement further comprises a resistor mounted in the pump current loop of said secondary air pump; and, wherein said second sensor is a measuring device for measuring a voltage drop across said resistor.

14. The arrangement of claim 12, wherein said second sensor is a Hall sensor mounted on said secondary air pump.

* * * * *